(12) United States Patent
Iwashita et al.

(10) Patent No.: US 12,017,482 B2
(45) Date of Patent: *Jun. 25, 2024

(54) TIRE

(71) Applicant: Sumitomo Rubber Industries, Ltd., Kobe (JP)

(72) Inventors: Takeru Iwashita, Kobe (JP); Hiroshi Yamaoka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/691,998

(22) Filed: Mar. 10, 2022

(65) Prior Publication Data

US 2022/0314702 A1 Oct. 6, 2022

(30) Foreign Application Priority Data

Apr. 5, 2021 (JP) .................. 2021-064362

(51) Int. Cl.
*B60C 11/12* (2006.01)
*B60C 11/03* (2006.01)

(52) U.S. Cl.
CPC ...... *B60C 11/1204* (2013.01); *B60C 11/1236* (2013.01); *B60C 2011/0353* (2013.01)

(58) Field of Classification Search
CPC ............. B60C 11/1204; B60C 11/1236; B60C 2011/1254; B60C 2011/0386; B60C 2011/039; B60C 11/039

See application file for complete search history.

(56) References Cited

U.S. PATENT DOCUMENTS

| | | |
|---|---|---|
| 2012/0261045 A1 | 10/2012 | Matsushita |
| 2017/0253087 A1* | 9/2017 | Shimura ................... B60C 5/00 |
| 2018/0154697 A1* | 6/2018 | Yamaoka ............ B60C 11/1236 |
| 2018/0154698 A1 | 6/2018 | Takahashi |
| 2019/0308462 A1* | 10/2019 | Yamaoka ............ B60C 11/0306 |
| 2020/0376898 A1 | 12/2020 | Yamaoka et al. |

(Continued)

FOREIGN PATENT DOCUMENTS

| | | |
|---|---|---|
| EP | 0 914 975 A2 | 5/1999 |
| EP | 0 914 975 A3 | 7/1999 |
| JP | 2001-315508 A | 11/2001 |

(Continued)

OTHER PUBLICATIONS

Machine Translation JP 2014-076764 (Year: 2014).*
Extended European Search Report for corresponding European Application No. 22163620.2, dated Sep. 6, 2022.

*Primary Examiner* — Justin R Fischer
*Assistant Examiner* — Wendy L Boss
(74) *Attorney, Agent, or Firm* — Birch, Stewart, Kolasch & Birch, LLP

(57) ABSTRACT

A tire includes a tread portion provided with a first land region demarcated between a shoulder circumferential groove and a tread edge. The first land region is provided with first sipes extending in a tire circumferential direction, axial sipes, and first axial grooves extending from the tread edge. The first sipes are not connected with the first axial grooves. Each of the axial sipes has an axially inner end connected with the shoulder circumferential groove. Each of the axial sipes has an axially outer end connected with one of the first sipes.

18 Claims, 5 Drawing Sheets

(56) References Cited

U.S. PATENT DOCUMENTS

2023/0094643 A1* 3/2023 Kajiyama ........... B60C 11/1204
152/209.8

FOREIGN PATENT DOCUMENTS

| JP | 2007-125978 A | | 5/2007 |
|---|---|---|---|
| JP | 2014076764 A | * | 5/2014 |
| JP | 2020-196286 A | | 12/2020 |

* cited by examiner

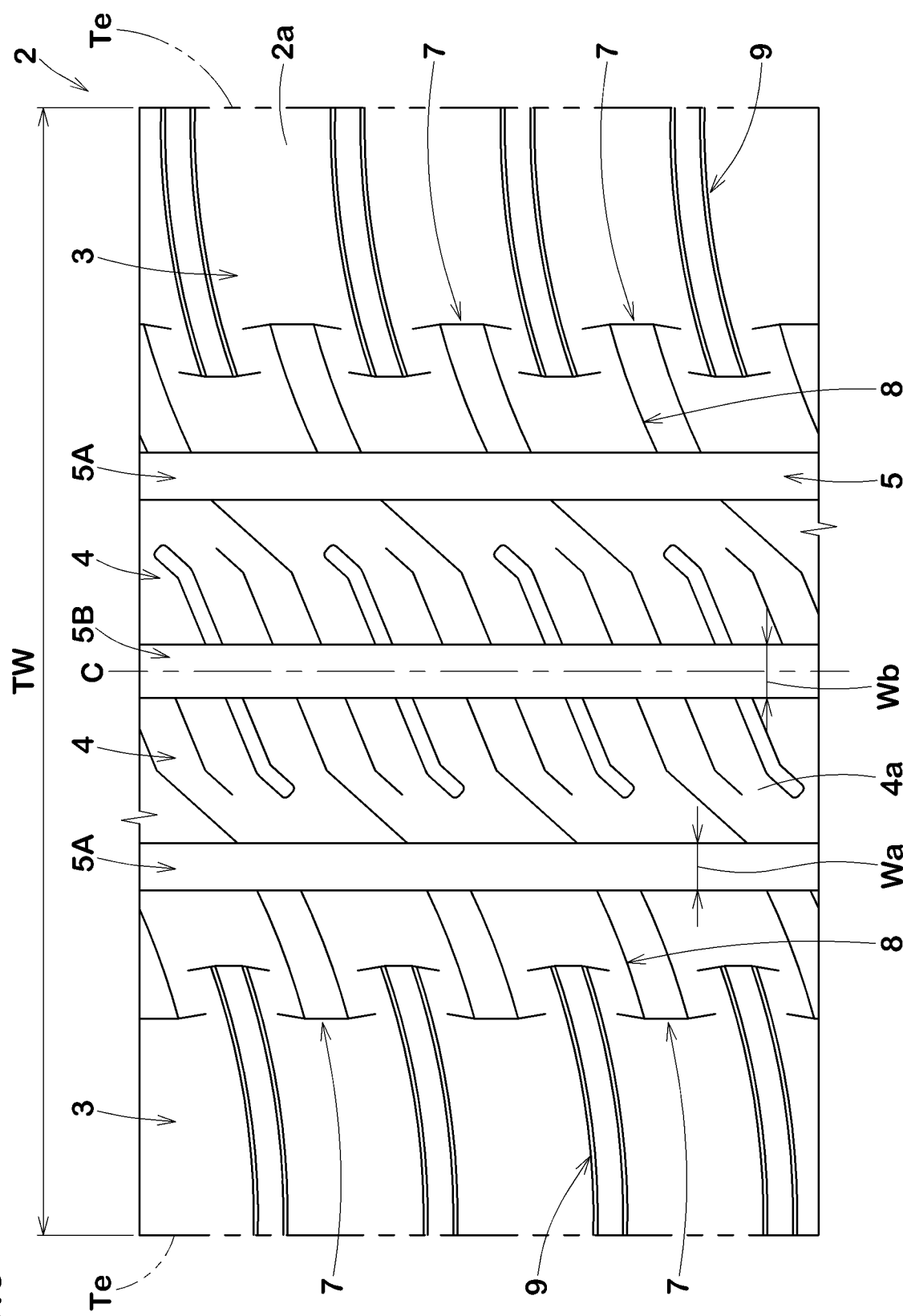

TIRE

RELATED APPLICATIONS

This application claims the benefit of foreign priority to Japanese Patent Applications No. JP2021-064362, filed Apr. 5, 2021, which are incorporated by reference in its entirety.

FIELD OF THE INVENTION

The present disclosure relates to a tire.

BACKGROUND OF THE INVENTION

The following Patent Document 1 has described a pneumatic tire having an outer region to be on an outer side of a vehicle than a tire equator when mounted on the vehicle. The outer region has a middle land region and a shoulder land region. The middle land region has outer middle lateral grooves crossing the middle land region, and the shoulder land region has outer shoulder lateral grooves crossing the shoulder land region. The following Patent Document 1 is said to improve dry performance, wet performance, and anti-wear performance by specifying the inclination direction and angle of the outer middle lateral grooves and the outer shoulder lateral grooves.

PRIOR ART

Patent Document

[Patent Document 1]
Japanese Unexamined Patent Application Publication No. 2020-196286

SUMMARY OF THE INVENTION

Problems to be Solved by the Invention

In recent years, there has been a demand for further improvement of the dry performance. In order to improve the dry performance, it is required to increase an equivalent cornering power (equivalent CP) of the tire, for example.

The equivalent CP is a cornering power (CP) divided by a self-aligning torque power (SATP). The CP is generally increased by increasing rigidity of a tread portion. The SATP is a self-aligning torque (SAT) when a slip angle of 1 degree is applied to a tire during running. The SAT is indicated by a sum of braking force and drive power on a tire circumferential direction line of a tread ground contacting area. Therefore, an increase of the rigidity in the tire circumferential direction of the tread portion leads to an increase in the SATP, therefore, it is not possible that the equivalent CP is increased.

Therefore, in order to improve the dry performance, it is effective to maintain the SATP small while suppressing the decrease in the CP, i.e., to suppress the increase of the rigidity in the tire circumferential direction of the tread portion. In particular, it is desirable to suppress the increase of the rigidity in the tire circumferential direction on tread edges where the SAT is maximum.

The present disclosure was made in view of the above, and a primary object thereof is to provide a tire having the further improved dry performance.

Means for Solving the Problems

The present disclosure is a tire having a tread portion, a tread edge, a shoulder circumferential groove provided in the tread portion and extending in a tire circumferential direction, and a first land region demarcated between the shoulder circumferential groove and the tread edge, wherein the first land region is provided with a plurality of first sipes extending in the tire circumferential direction, a plurality of axial sipes, and a plurality of first axial grooves extending inward in a tire axial direction from the tread edge, the first sipes are not connected with the first axial grooves, each of the axial sipes has an inner end in the tire axial direction connected with the shoulder circumferential groove, and each of the axial sipes has an outer end in the tire axial direction connected with one of the first sipes.

Effects of the Invention

It is possible that the tire of the present disclosure exerts excellent dry performance by employing the above configuration.

BRIEF DESCRIPTION OF THE DRAWINGS

FIG. 3 is an overall plan view of the tread portion.

DETAILED DESCRIPTION OF THE INVENTION

An embodiment of the present disclosure will now be described in conjunction with accompanying drawings.

Figure 1:
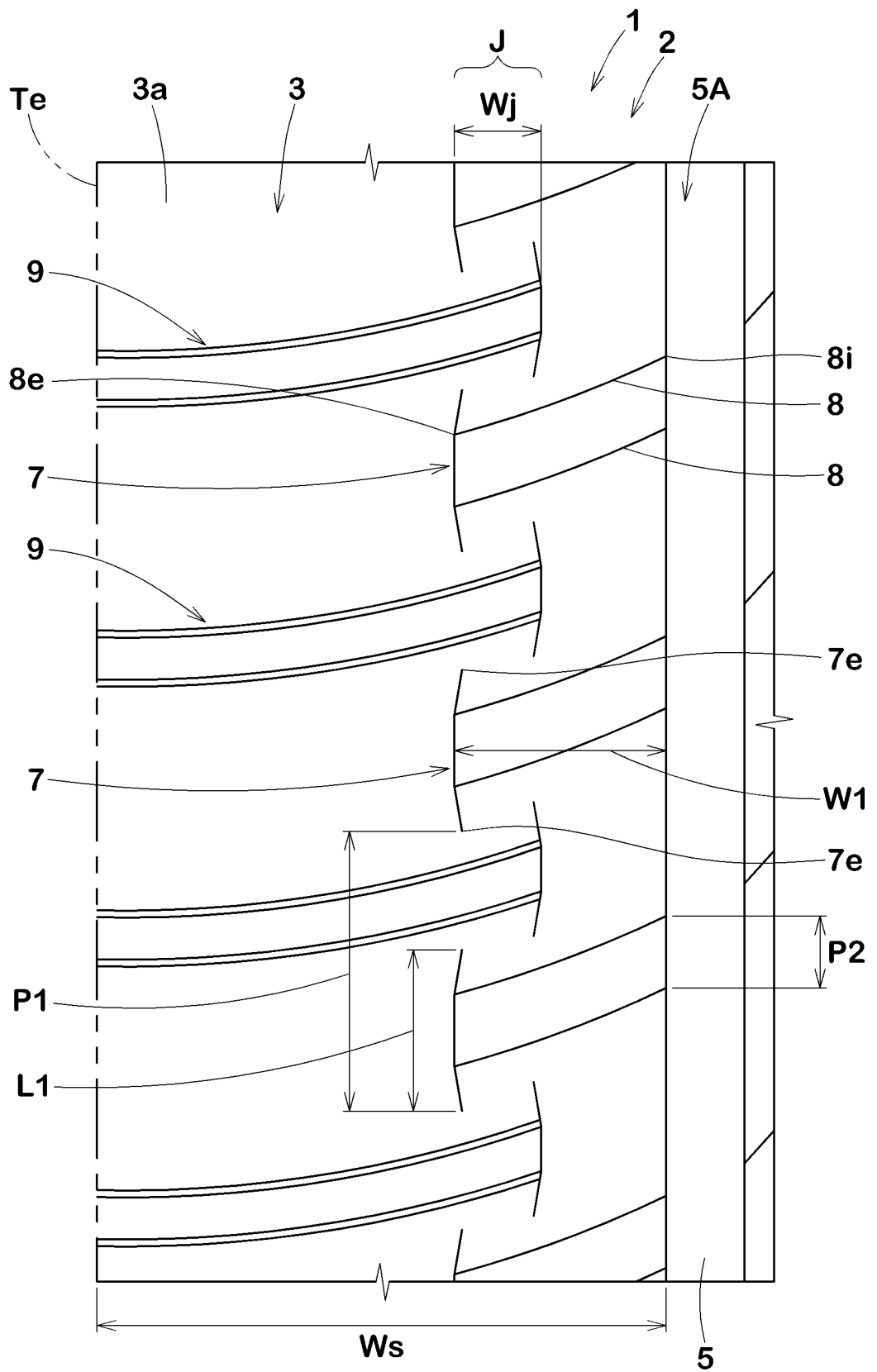
FIG. 1 is a plan view of a first land region of the tread portion showing an embodiment of the present disclosure.

FIG. 1 is an enlarged plan view of a tread portion 2 of a tire 1 of the present embodiment. The tire 1 of the present embodiment is suitably used for pneumatic tires for passenger cars, for example. However, the present disclosure can be employed in pneumatic tires for heavy load, for light trucks, and the like, and in non-pneumatic tires not filled with compressed air, for example.

As shown in FIG. 1, the tread portion 2 of the present embodiment is provided with circumferential grooves 5 extending continuously in the tire circumferential direction. The circumferential grooves 5 in the present embodiment include shoulder circumferential grooves 5A each located closest to a respective one of tread edges (Te). The tread portion 2 is provided with first land regions 3 each demarcated between one of the shoulder circumferential grooves 5A and one of the tread edges (Te) adjacent thereto, for example.

The tread edges (Te) are outermost ground contacting positions in a tire axial direction when the tire 1 in a standard state is in contact with a flat surface with zero camber angle by being loaded with a standard tire load. The standard state is a state in which the tire 1 is mounted on a standard rim (not shown), inflated to a standard inner pressure, and loaded with no tire load. Unless otherwise noted, the dimensions and the like of various parts of the tire are the values measured under the standard state described above. Further, the distance in the tire axial direction between the tread edges (Te) on both sides in the tire axial direction is a tread width TW (shown in FIG. 3).

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

The "standard tire load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

Each of the first land regions 3 is provided with a plurality of first sipes 7 extending in the tire circumferential direction, a plurality of axial sipes 8, and first axial grooves 9 each extending axially inward from a respective one of the tread edges (Te). The first axial grooves 9 extending from the tread edges (Te) decrease the rigidity in the tire circumferential direction on the tread edges (Te) of the first land regions 3, thereby decreasing the SATP and increasing the equivalent CP. Therefore, the dry performance is improved. Further, the first axial grooves 9 smoothly drain a water film on ground contacting surfaces (3a) of the first land regions 3 from the tread edges (Te), thereby, the wet performance is improved. In the present specification, the term "sipe" refers to an incised body having a width of less than 1.5 mm. Further, in the present specification, the term "groove" including axial grooves and circumferential grooves refers to a groove-shaped body having a groove width of 1.5 mm or more.

The first sipes 7 are not connected to the first axial grooves 9. The first sipes 7 configured as such suppress local decrease in the rigidity of the first land regions 3, therefore, the dry performance is maintained high. In addition, the first sipes 7 configured as such improve uneven wear resistance performance. The first sipes 7 in the present embodiment are not connected to all the grooves arranged in the first land regions 3 and not directly connected to the shoulder circumferential grooves 5A.

Each of the axial sipes 8 has an inner end (8i) in the tire axial direction connected to a respective one of the shoulder circumferential grooves 5A. Further, each of the axial sipes 8 has an outer end (8e) in the tire axial direction connected to one of the first sipes 7. As a result, the SATP is decreased at the connection portions between the axial sipes 8 and the first sipes 7 and at the connection portions between the axial sipes 8 and the shoulder circumferential grooves 5A, therefore, a ground contacting property with a road surface is improved, thereby, the dry performance is further improved.

FIG. 3 is a plan view of the tread portion 2. As shown in FIG. 3, the circumferential grooves 5 in the present embodiment include a pair of shoulder circumferential grooves 5A and a crown circumferential groove 5B arranged between the shoulder circumferential grooves 5A. The crown circumferential groove 5B is arranged on a tire equator (C) in the present embodiment. The tread portion 2 in the present embodiment has a point symmetric pattern centered at an arbitrary point on the tire equator (C).

Further, the tread portion 2 is provided with second land regions 4 each arranged axially inside and adjacent to a respective one of the shoulder circumferential grooves 5A. Each of the second land regions 4 is demarcated between the crown circumferential groove 5B and a respective one of the shoulder circumferential grooves 5A in the present embodiment. The second land regions 4 in the present embodiment are arranged on both sides of the tire equator (C).

The shoulder circumferential grooves 5A and the crown circumferential groove 5B extend linearly along the tire circumferential direction in the present embodiment. The shoulder circumferential grooves 5A and the crown circumferential groove 5B may extend in a wavy or zigzag manner, for example.

It is preferred that the crown circumferential groove 5B has a groove width (Wb) larger than a groove width (Wa) of each of the shoulder circumferential grooves 5A. Thereby, it is possible that water films on ground contacting surfaces (4a) of the second land regions 4, which are difficult to drain, are effectively discharged, therefore, the wet performance is improved. From the point of view of achieving both the dry performance and the wet performance, it is preferred that the groove width (Wb) of the crown circumferential groove 5B is 110% or more and 140% or less of the groove width (Wa) of each of the shoulder circumferential grooves 5A. It is preferred that the groove width (Wa) of each of the shoulder circumferential grooves 5A is about 3% or more and about 10% or less of the tread width TW, for example. Further, it is preferred that each of the shoulder circumferential grooves 5A has a groove depth (not shown) of 8.5 mm or and 11.5 mm or less, for example. Furthermore, it is preferred that the crown circumferential groove 5B has a groove depth (not shown) of 85% or more and 115% or less of the groove depth of each of the shoulder circumferential grooves 5A.

As described above, the first land regions 3 include the tread edges (Te) and are located axially outermost, therefore, the first land regions 3 are the land regions which are subject to large lateral forces during cornering. Since the first land regions 3 are provided with the first sipes 7, the dry performance and the wet performance especially during cornering are improved.

As shown in FIG. 1, each of the first sipes 7 extends in a circular arc shape. Each of the first sipes 7 configured as such has a relatively large length compared with a linear sipe (not shown). Therefore, effectiveness of scratching force of the first sipes 7 in draining the water films between a road surface and the ground contacting surfaces (3a) of the first land regions 3, thereby, the wet performance is improved. The term "circular arc shape" includes not only the shape in which the angle of the sipe with respect to the tire axial direction changes continuously, but also the shape having at least two bends where the angle changes by 5 degrees or less at arbitrary points on the sipe.

Figure 2A:
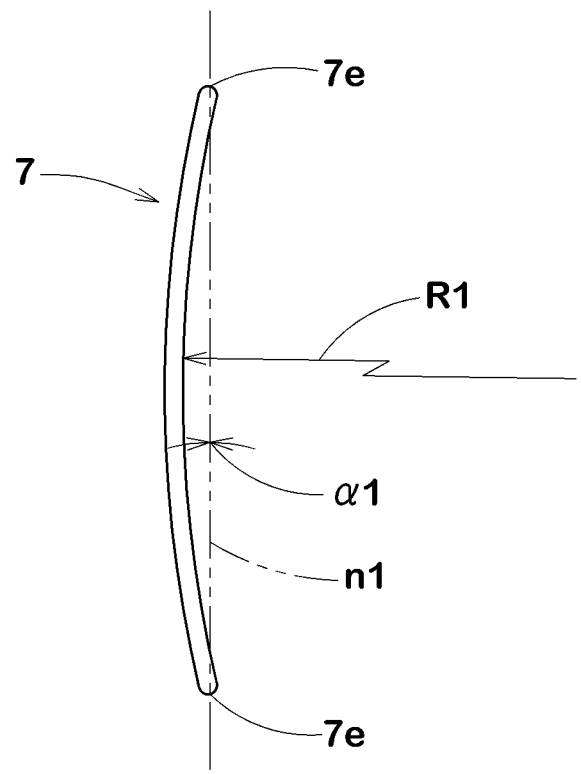
FIG. 2A is an enlarged view of a first sipe.

FIG. 2A is an enlarged view of one of the first sipes 7. As shown in FIG. 2A, in each of the first sipes 7 in the tread plan view, a virtual sipe reference line (n1) obtained by linearly connecting both ends (7e) of the each of the first sipe 7 has an angle ($\alpha$1) of 10 degrees or less with respect to the tire circumferential direction. The first sipes 7 configured as such improve the ground contacting property with a road surface while suppressing excessive decrease in the rigidity in the tire circumferential direction of the first land regions 3, therefore, the dry performance and the wet performance are improved.

As shown in FIG. 1, in the tread plan view, a radius of curvature R1 (shown in FIG. 2A) of each of the first sipes 7 is preferably 100% or more, more preferably 150% or more, and preferably 250% or less, more preferably 200% or less of a width (Ws) in the tire axial direction of each of the first land regions 3. Since the radius of curvature R1 of each of the first sipes 7 is 100% or more of the width (Ws) of each of the first land regions 3, excessive decrease in the rigidity of the first land regions 3 is suppressed. Since the radius of curvature R1 is 250% or less of the width (Ws) of each of the first land regions 3, it is possible that a large length of each of the first sipes 7 is secured. It is preferred that the radius of curvature R1 of each of the first sipes 7 is larger than the width (Ws) in the tire axial direction of each of the first land regions 3. It should be noted that the term radius of curvature in the present specification refers to a radius of a single arc passing through three points that are the two ends and the center of the sipe.

Each of the first sipes 7 has a length L1 in the tire circumferential direction preferably of 40% or more, more preferably of 45% or more and preferably of 70% or less, more preferably of 65% or less of a pitch P1 between the first sipes 7 adjacent to each other in the tire circumferential direction, for example. Thereby, it is possible that the improvement of the wet performance due to the scratching force of the first sipes 7 is maintained while excessive decrease in the rigidity of the first land regions 3 is suppressed.

Each of the first sipes 7 has a depth (not shown) preferably of 50% or more, more preferably of 75% or more, and preferably of 100% or less, more preferably of 85% or less of the groove depth of each of the shoulder circumferential grooves 5A, for example. It is preferred that the depth of each of the first sipes 7 is smaller than the groove depth of each of the shoulder circumferential grooves 5A.

Each of the first sipes 7 is directly connected with multiple axial sipes 8, for example. In the present embodiment, each of the first sipes 7 is directly connected with two axial sipes 8. Therefore, the ground contacting property at the connection portions between the axial sipes 8 and the first sipes 7 is improved. In addition, the axial sipes 8 configured as such moderately decrease the rigidity in the tire circumferential direction of the first land regions, therefore, the SATP is decreased. In each of the first sipes 7, a pitch P2 in the tire circumferential direction between the axial sipes 8 directly connected to the each of the first sipes 7 is preferably 40% or more, more preferably 45% or more and preferably 60% or less, more preferably 55% or less of the length L1 in the tire circumferential direction of the first sipes 7, for example.

The axial sipes 8 are continuously inclined to one side in the tire circumferential direction with respect to the tire axial direction (down to the left in the drawings), for example. Further, each of the axial sipes 8 is formed in an arc shape convex to one side in the tire circumferential direction (lower side in the drawings). The axial sipes 8 configured as such have relatively greater lengths than straight sipes, therefore, the wet performance is improved. The axial sipes 8 are not limited to such an embodiment, and various shapes can be adopted.

Although not particularly limited, a length W1 in the tire axial direction of each of the axial sipes 8 is preferably 25% or more, more preferably 30% or more and preferably 55% or less, more preferably 50% or less of the width (Ws) of each of the first land regions 3. Further, a depth (not shown) of each of the axial sipes 8 is preferably 80% or more, more preferably 90% or more and preferably 120% or less, more preferably 110% or less of the depth of each of the first sipes 7.

Each of the first axial grooves 9 is arranged between the first sipes 7 adjacent to each other in the tire circumferential direction, for example. The first axial grooves 9 are arranged such that one first axial groove 9 is arranged between each pair of the first sipes 7 adjacent to each other. Thereby, excessive decrease in the rigidity of the first land regions 3 is suppressed, therefore, both of the wet performance and the dry performance are exerted.

The first axial grooves 9 are inclined continuously with respect to the tire axial direction to one side in the tire circumferential direction (down to the left in the drawings), for example. As just described, the first axial grooves 9 are inclined to the same side as the axial sipes 8. Further, each of the first axial grooves 9 is formed in an arc shape convex to one side in the tire circumferential direction (lower side in the drawings). As described above, the first axial grooves 9 are formed in arc shapes convex to the same side as the axial sipes 8. As a result, since a length in the tire circumferential direction between one of the first axial grooves 9 and one of the axial sipes 8 adjacent to each other is secured, local decrease in the rigidity of the first land regions 3 is suppressed, therefore, the uneven wear resistance performance is maintained high.

The first axial grooves 9 overlap with the axial sipes 8 in the tire axial direction, for example. In other words, in the first land regions 3, overlapping regions (J) where the first axial grooves 9 and the axial sipes 8 overlap in the tire axial direction are formed to extend in the tire circumferential direction. The overlapping regions (J) configured as such moderately decrease the rigidity in the tire circumferential direction of the first land regions 3, therefore, it is possible that the SATP is further decreased.

Although not particularly limited, a width (Wj) in the tire axial direction of each of the overlapping regions (J) is preferably 5% or more, more preferably 10% or more, and preferably 35% or less, more preferably 30% or less of the width (Ws) of each of the first land regions 3.

Figure 4:
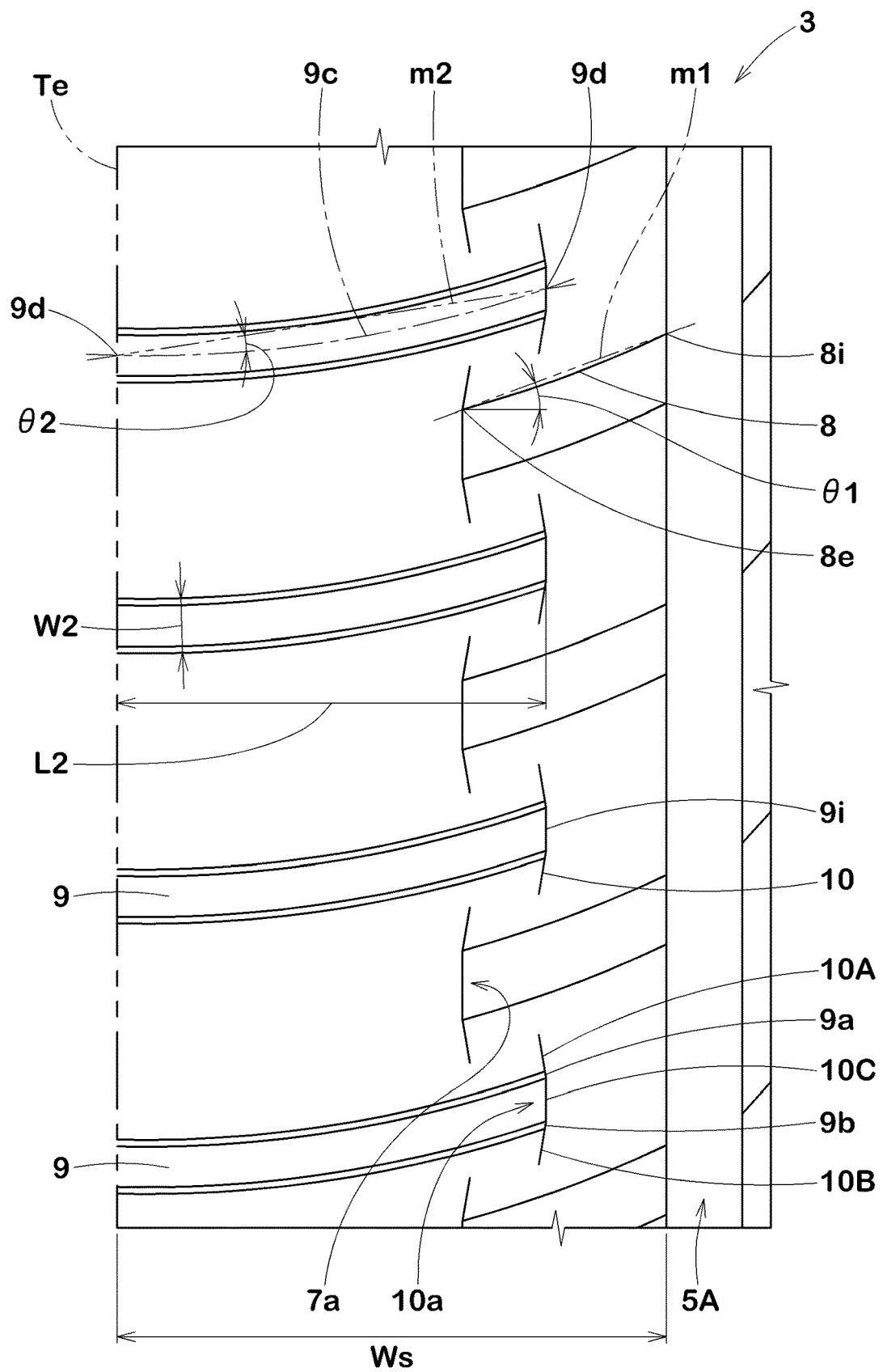
FIG. 4 is a plan view of the first land region.

FIG. 4 is a plan view of one of the first land regions 3. As shown in FIG. 4, it is preferred that each of the first axial grooves 9 has an angle θ2 with respect to the tire axial direction smaller than an angle θ1 with respect to the tire axial direction of each of the axial sipes 8. As a result, the rigidity in the tire axial direction on the tread edge (Te) side of the first land regions 3, where lateral forces act strongly, is maintained at a high level, therefore, the uneven wear resistance performance is improved. In the present specification, the angle θ2 is an inclination angle of a virtual line (m2) obtained by connecting both ends (9d) of a center line (9c) of each of the first axial grooves 9. The angle θ1 is an inclination angle of a virtual line (m1) obtained by connecting both ends of each of the axial sipes 8.

Although not particularly limited, in order to improve the dry performance and the uneven wear resistance performance, a difference (θ1−θ2) between the angle θ1 of each of the axial sipes 8 and the angle θ2 of each of the first axial grooves 9 is preferably 5 degrees or more, more preferably 7 degrees or more, and preferably 15 degrees or less, more preferably 13 degrees or less. Further, the angle θ2 of each of the first axial grooves 9 is preferably 20 degrees or more, more preferably 25 degrees or more, and preferably 40 degrees or less, more preferably 35 degrees or less.

A length L2 in the tire axial direction of each of the first axial grooves 9 is preferably 75% or more, more preferably 77% or more, and preferably 85% or less, more preferably 83% or less. Since the length L2 of each of the first axial grooves 9 is 75% or more of the width (Ws) of each of the first land regions 3, the wet performance is improved. Since the length L2 of each of the first axial grooves 9 is 85% or less of the width (Ws) of each of the first land regions 3, excessive decrease in the rigidity is suppressed, thereby, the uneven wear resistance performance is improved.

Although not particularly limited, a groove width W2 of each of the first axial grooves 9 is preferably 65% or more, more preferably 70% or more, and preferably 85% or less, more preferably 80% or less of the groove width (Wa) of each of the shoulder circumferential grooves 5A. Further, a groove depth (not shown) of each of the first axial grooves 9 is preferably 60% or more, more preferably 70% or more, and preferably 100% or less, more preferably 90% or less of the groove depth of each of the shoulder circumferential grooves 5A.

The first land regions 3 of the present embodiment are provided with second sipes 10 each directly connected to an inner end (9i) in the tire axial direction of a respective one of the first axial grooves 9. The second sipes 10 configured as such moderately decrease the rigidity in the tire axial direction near the inner ends (9i) of the first axial grooves 9, which helps to decrease the SATP.

The second sipes 10 extend in the tire circumferential direction, for example. Therefore, the ground contacting property of the ground contacting surfaces (3a) in the first land regions 3 is improved, thereby, the dry performance and the wet performance are improved.

Figure 2B:
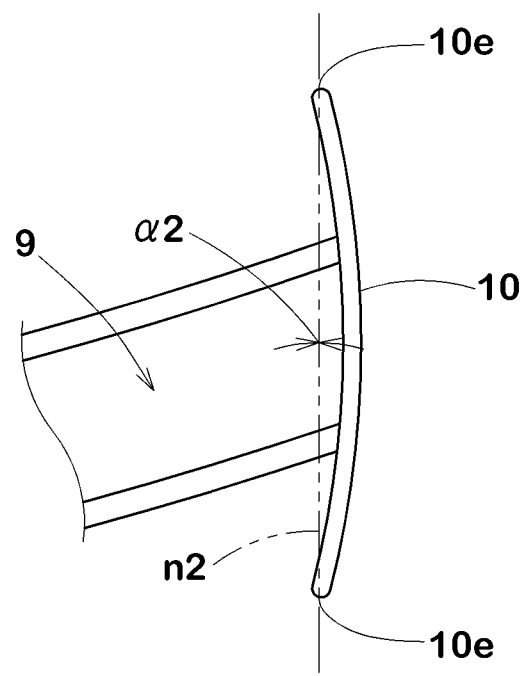
FIG. 2B is an enlarged view of a second sipe.

FIG. 2B is an enlarged view of one of the second sipes 10. As shown in FIG. 2B, in each of the second sipes 10 in the tread plan view, a virtual sipe reference line (n2) obtained by linearly connecting both ends (10e) of the each of the second sipes 10 has an angle ($\alpha 2$) of 10 degrees or less with respect to the tire circumferential direction. Thereby, the effects described above are effectively exerted.

As shown in FIG. 4, in the tread plane view, each of the second sipes 10 has an arc shape convex axially inward. As just described above, the second sipes 10 of the present embodiment are arcs convex to the opposite side to the first sipes 7. In other words, in the tread plane view, the first sipes 7 are arcs convex axially outward. Therefore, in each of the first land regions 3 of the present embodiment, the first sipes 7 convex axially outward and the second sipes 10 convex axially inward are arranged alternately one by one in the tire circumferential direction. Thereby, local decrease in the rigidity of the first land regions 3 due to the first sipes 7 and the second sipes 10 is moderated, therefore, the uneven wear resistance performance is maintained high.

The second sipes 10 are arranged axially inside the first sipes 7. As a result, in the first land regions 3 of the present embodiment, the first sipes 7 and the second sipes 10 are formed such that concave side portions (10a) of the second sipes 10 and concave side portions (7a) of the first sipes 7 face each other. The arrangement of the first sipes 7 and the second sipes 10 configured as such improves steering operability (transient characteristics) during cornering. In addition, one end in the tire circumferential direction of each of the first sipes 7 and the other end in the tire circumferential direction of one of the second sipes 10 adjacent thereto on the one end side arc arranged close to each other. Therefore, in each pair of the sipe 8 and the sipe 10 adjacent to each other, it is made easier for one of the sipes 8 and 10 to absorb the water film not fully absorbed by another of the sipes 8 and 10, thereby, the wet performance is improved. In addition, in the arrangement of the first sipes 7 and the second sipes 10 configured as such, since these sipes together form a shape similar to a single wavy sipe, the flow of water is made smooth in each of the sipes 7 and 10, therefore, the wet performance is improved.

In each pair of the first axial groove 9 and the second sipe 10 directly connected with each other, the second sipe 10 is formed, for example, by a first portion 10A, a second portion 10B, and a third portion 10C. The first portion 10A is connected directly to a first end (9a) in the tire circumferential direction of the first axial groove 9. The second portion 10B is directly connected to a second end (9h) on a side opposite to the first end (9a). The third portion 10C directly connects the first portion 10A and the second portion 10B. Each of the third portions 10C extends so as to form a respective one of the first axial grooves 9, for example. The first portion 10A has a depth (not shown) same as a depth (not shown) of the second portion 10B, for example.

It is preferred that the depth of each of the first portion 10A and the second portion 10B is not more than the groove depth of each of the first axial grooves 9. Further, it is preferred that the third portion 10C has a depth (not shown) not less than the depth of the first portion 10A. Furthermore, it is preferred that the depth (not shown) of the third portion 10C is not less than the groove depth of each of the first axial grooves 9.

The second sipes 10 are directly connected only to the first axial grooves 9. In other words, the second sipes 10 in the present embodiment are not connected with the first sipes 7 and the axial sipes 8. Thereby, excessive decrease in the rigidity of the first land regions 3 is suppressed.

Figure 5:
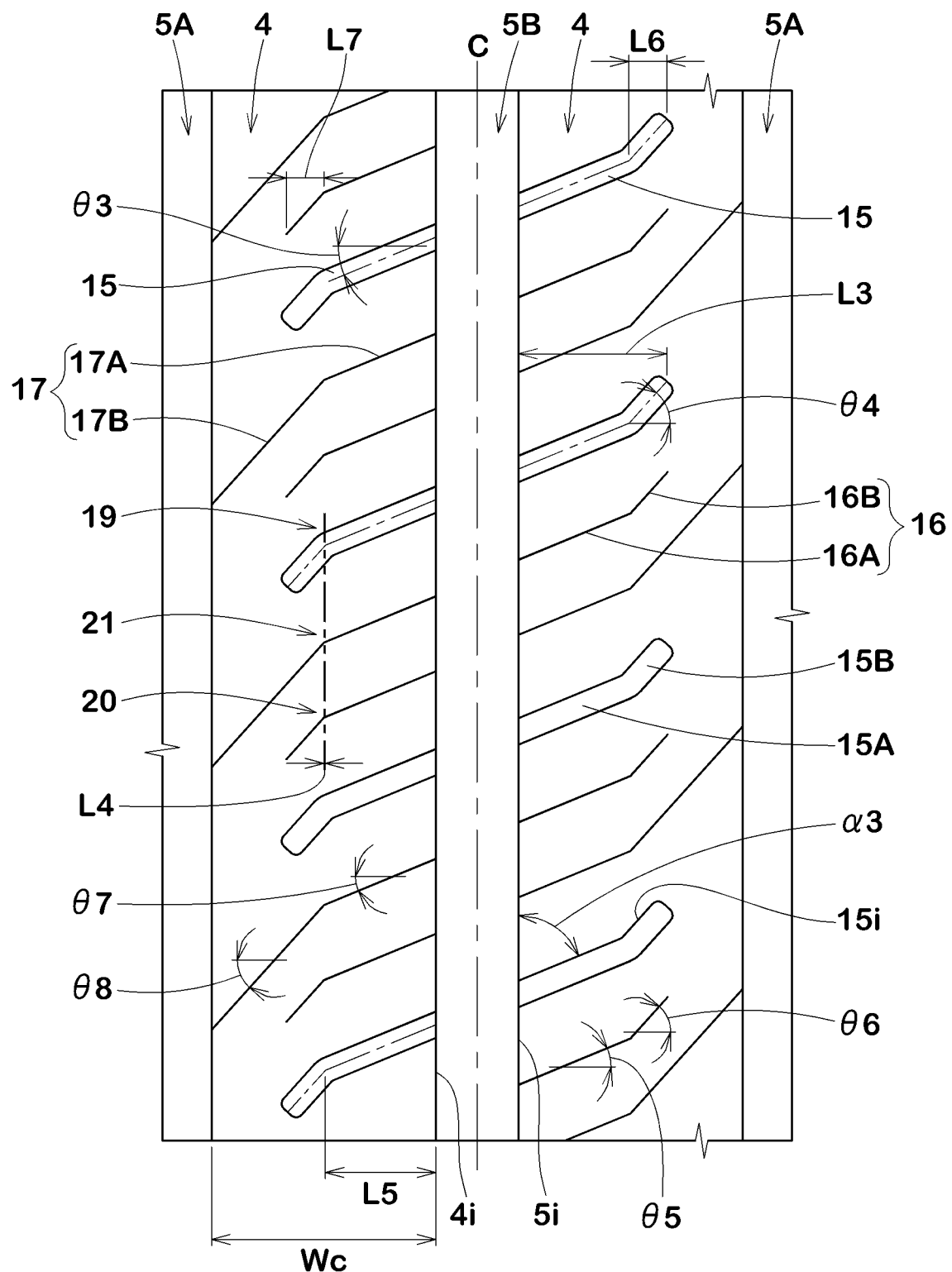
FIG. 5 is a plan view of a second land region.

FIG. 5 is a plan view of the second land regions 4. As shown in FIG. 5, the second land regions 4 of the present embodiment are provided with second axial grooves 15 extending in the tire axial direction. The second axial grooves 15 in the present embodiment are connected to the crown circumferential groove 5B. The second axial grooves 15 configured as such and extending in the tire axial direction also help to decrease the SATP. In addition, the second axial grooves 15 drain the water therein to the crown circumferential groove 5B having a relatively larger groove width, therefore, the wet performance is improved.

Each of the second axial grooves 15 includes a first groove portion 15A extending from the crown circumferential groove 5B and a second groove portion 15B connected directly to the first groove portion 15A and inclined at an angle $\theta 4$ larger than the first groove portion 15A with respect to the tire axial direction. The first groove portion 15A is inclined with respect to the tire axial direction, for example.

Each of the second axial grooves 15 has a length L3 in the tire axial direction preferably 50% or more, more preferably 55% or more, and preferably 85% or less, more preferably 80% or less of a width (Wc) in the tire axial direction of each of the second land regions 4.

It is preferred that an angle $\alpha 3$ between each of the second axial grooves 15 and the crown circumferential groove 5B is 30 degrees or more and 60 degrees or less. Since the angle $\alpha 3$ is 30 degrees or more, the flow of water between the second axial grooves 15 and the crown circumferential groove 5B is made smooth, therefore, high wet performance is exerted. Since the angle $\alpha 3$ is 60 degrees or less, decrease in the rigidity at the intersections of the second axial grooves 15 and the crown circumferential groove 5B is suppressed, therefore, the occurrence of uneven wear is suppressed. Thereby, the angle $\alpha 3$ is more preferably 35 degrees or more and more preferably 55 degrees or less. In the present specification, the angle $\alpha 3$ is defined as an angle between a groove edge (15i) on one side of each of the second axial grooves 15 and a groove edge (5i) of the crown circumferential groove 5B connected directly to the groove edge (15i).

The second land regions 4 are provided with axial sipes 16 extending axially outward from the crown circumferential groove 5B to each terminate to have a closed end within a respective one of the second land regions 4, for example. Each of the axial sipes 16 has a first sipe portion 16A extending from the crown circumferential groove 5B and a second sipe portion 16B directly connected to the first sipe portion 16A and inclined at an angle θ6 larger than the first sipe portion 16A with respect to the tire axial direction. The first sipe portion 16A of the present embodiment is inclined with respect to the tire axial direction.

The second land regions 4 are provided with crossing sipes 17 each extending to completely cross a respective one of the second land regions 4, for example. Each of the crossing sipes 17 in the present embodiment has a third sipe portion 17A extending from the crown circumferential groove 5B and a fourth sipe portion 17B directly connected to the third sipe portion 17A and inclined at an angle θ8 larger than the third sipe portion 17A with respect to the tire axial direction. The third sipe portion 17A of the present embodiment is inclined with respect to the tire axial direction.

A first inflection point 19 where the first groove portion 15A and the second groove portion 15B are connected, a second inflection point 20 where the first sipe portion 16A and the second sipe portion 16B are connected, and a third inflection point 21 where the third sipe portion 17A and the fourth sipe portion 17B are connected are arranged at the same position in the tire axial direction. Therefore, on a tire circumferential direction line where the first inflection points 19 are located, the rigidity in the tire circumferential direction of each of the second land regions 4 is decreased, thereby, it is possible that the SATP is decreased. In the present specification, the expression "arranged at the same position" means that a maximum separation distance L4 between the inflection points 19 to 21 in the tire axial direction is within 10% of the width (Wc) of each of the second land regions 4. Further, in each of the second land regions 4, it is preferred that a distance L5 in the tire axial direction between the first inflection point 19 and an inner end (4i) in the tire axial direction of the second land region 4 is 45% or more and 55% or less of the width (Wc) of the second land region 4. Thereby, excessive decrease in the rigidity of the second land regions 4 is suppressed.

It is preferred that an angle θ3 of the first groove portion 15A with respect to the tire axial direction, an angle θ5 of the first sipe portion 16A with respect to the tire axial direction, and an angle θ7 of the third sipe portion 17A with respect to the tire axial direction are the same. Therefore, excessive decrease in the rigidity of the second land regions 4, which are subject to large ground contact pressure during straight-away driving, is suppressed. In the present specification, the above expression "the same angle" means that an absolute value of a difference between the angle θ3 of the first groove portion 15A and each of the angles θ5 and θ7 of the sipe portions 16A and 17A is 5 degrees or less. The angle θ3 of the first groove portion 15A is preferably 30 degrees or more, more preferably 35 degrees or more, and preferably 60 degrees or less, more preferably 55 degrees or less, for example.

From the similar point of view, it is preferred that the angle θ4 of the second groove portion 15B, the angle θ6 of the second sipe portion 16B, and the angle θ8 of the fourth sipe portion 17B are the same. The angle θ4 of the second groove portion 15B is preferably 35 degrees or more, more preferably 40 degrees or more, and preferably 55 degrees or less, more preferably 50 degrees or less, for example.

It is preferred that a length L6 in the tire axial direction of the second groove portion 15B is the same as a length L7 in the tire axial direction of the second sipe portion 16B. In the present specification, the expression of the "same" length means that an absolute value of a difference between the length L6 of the second groove portion 15B and the length L7 of the second sipe portion 16B is 10% or less of the width (Wc) of each of the second land regions 4.

It is preferred that a depth (not shown) of each of the second axial grooves 15 is larger than a depth (not shown) of each of the axial sipes 16. Therefore, the effect of improving drainage property while suppressing decrease in block rigidity is exerted.

From the similar point of view, it is preferred that a groove depth (not shown) of each of the second axial grooves 15 is larger than a depth (not shown) of each of the crossing sipes 17.

Although not particularly limited, the groove depth of each of the second axial grooves 15 is preferably 30% or more, more preferably 40% or more, and preferably 100% or less, more preferably 90% or less.

While detailed description has been made of the tire according to an embodiment of the present disclosure, the present disclosure can be embodied in various forms without being limited to the illustrated embodiment above.

Examples

Tires having the basic patter shown in FIG. 3 were made by way of test. Then each of the test tires was tested for the dry performance, the wet performance, and the uneven wear resistance performance. Common specifications of the test tires and the test methods were as follows.

<Dry Performance, Wet Performance, and Uneven Wear Resistance Performance>

Each of the test tires was mounted on a test vehicle described below. While a test driver drove the test vehicle on test courses of a dry asphalt road surface and a wet asphalt road surface, the test driver evaluated the dry performance and the wet performance based on stability and operability for each test tire by the driver's feeling. In addition, the test driver visually and by the driver's feeling evaluated the uneven wear resistance performance based on uneven wear generated during running on the test courses described above.

The results are indicated by an evaluation point based on Reference 1 being 100, wherein a larger numerical value is better.

Tire size: 205/65R16
Tire rim: 16×6.5 J
Tire inner pressure (kPa): 390 (front wheel)/420 (rear wheel)
Test vehicle: passenger car with a displacement of 2000 cc
Test results are shown in Table 1.

TABLE 1

|  | Ref. 1 | Ref. 2 | Ex. 1 | Ex. 2 | Ex. 3 | Ex. 4 | Ex. 5 |
| --- | --- | --- | --- | --- | --- | --- | --- |
| Connection between First sipe and First axial groove | connected | not connected | not connected | not connected | not connected | not connected | not connected |
| Number of Axial sipes connected to First sipe | 2 | 0 | 2 | 1 | 2 | 2 | 2 |

TABLE 1-continued

|  | Ref. 1 | Ref. 2 | Ex. 1 | Ex. 2 | Ex. 3 | Ex. 4 | Ex. 5 |
|---|---|---|---|---|---|---|---|
| Length L2/Width (Ws) [%] | 80 | 80 | 80 | 80 | 70 | 90 | 80 |
| Angle $\theta 2$ [degree] | 30 | 30 | 30 | 30 | 30 | 30 | 15 |
| Length L3/Width (Wc) [%] | 75 | 75 | 75 | 75 | 75 | 75 | 75 |
| Angle $\alpha 3$ [degree] | 45 | 45 | 45 | 45 | 45 | 45 | 45 |
| Presence or Absence of Crossing sipe | Presence | Presence | Presence | Presence | Presence | Presence | Presence |
| Presence or Absence of Axial sipe | Presence | Presence | Presence | Presence | Presence | Presence | Presence |
| Dry performance [evaluation point: larger is better] | 100 | 105 | 110 | 114 | 112 | 106 | 110 |
| Wet performance [evaluation point: larger is better] | 100 | 93 | 110 | 102 | 102 | 112 | 104 |
| Uneven wear resistance performance [evaluation point: larger is better] | 100 | 102 | 110 | 110 | 112 | 106 | 112 |
| Total point [320 or more is good] | 300 | 300 | 330 | 326 | 326 | 324 | 326 |

TABLE 2

|  | Ex.6 | Ex.7 | Ex.8 | Ex.9 | Ex.10 | Ex.11 | Ex.12 |
|---|---|---|---|---|---|---|---|
| Connection between First sipe and First axial groove | not connected | not connected | not connected | not connected | not connected | not connected | not connected |
| Number of Axial sipes connected to First sipe | 2 | 2 | 2 | 2 | 2 | 2 | 2 |
| Length L2/Width (Ws) [%] | 80 | 80 | 80 | 80 | 80 | 80 | 80 |
| Angle $\theta 2$ [degree] | 50 | 30 | 30 | 30 | 30 | 30 | 30 |
| Length L3/Width (Wc) [%] | 75 | 45 | 90 | 75 | 75 | 75 | 75 |
| Angle $\alpha 3$ [degree] | 45 | 45 | 45 | 20 | 70 | 45 | 45 |
| Presence or Absence of Crossing sipe | Presence | Presence | Presence | Presence | Presence | Absence | Presence |
| Presence or Absence of Axial sipe | Presence | Presence | Presence | Presence | Presence | Presence | Absence |
| Dry performance [evaluation point: larger is better] | 106 | 112 | 106 | 106 | 110 | 113 | 105 |
| Wet performance [evaluation point: larger is better] | 112 | 102 | 112 | 112 | 104 | 105 | 112 |
| Uneven wear resistance performance [evaluation point: larger is better] | 108 | 112 | 106 | 106 | 112 | 110 | 108 |
| Total point [320 or more is good] | 326 | 326 | 324 | 324 | 326 | 328 | 325 |

From the test results, it was confirmed that the tires in Examples had good dry performance. Further, the tires in the Examples had good wet performance and good uneven wear resistance performance.

STATEMENT OF DISCLOSURE

The present disclosure includes the following aspects.

[Present Disclosure 1]

A tire including a tread portion, a tread edge, a shoulder circumferential groove provided in the tread portion and extending in a tire circumferential direction, and a first land region demarcated between the shoulder circumferential groove and the tread edge, wherein the first land region is provided with a plurality of first sipes extending in the tire circumferential direction, a plurality of axial sipes, and a plurality of first axial grooves extending inward in a tire axial direction from the tread edge, the first sipes are not connected with the first axial grooves, each of the axial sipes has an inner end in the tire axial direction connected with the shoulder circumferential groove, and each of the axial sipes has an outer end in the tire axial direction connected with one of the first sipes.

[Present Disclosure 2]

The tire according to present disclosure 1, wherein at least one of the first sipes are each connected with the axial sipes.

[Present Disclosure 3]

The tire according to present disclosure 1 or 2, wherein the first land region is provided with a plurality of second sipes, and each of the second sipes is connected with an inner end in the tire axial direction of a respective one of the first axial grooves.

[Present Disclosure 4]

The tire according to present disclosure 3, wherein the second sipes extend in the tire circumferential direction.

[Present Disclosure 5]

The tire according to present disclosure 3 or 4, wherein the second sipes are connected only with the first axial grooves.

[Present Disclosure 6]

The tire according to any one of present disclosures 1 to 5, wherein each of the first axial grooves has a length in the tire axial direction of 75% or more and 85% or less of a width in the tire axial direction of the first land region.

[Present Disclosure 7]

The tire according to any one of present disclosures 1 to 6, wherein each of the first axial grooves has an angle of 20 degrees or more and 45 degrees or less with respect to the tire axial direction.

[Present Disclosure 8]

The tire according to any one of present disclosures 1 to 7, wherein the tread portion is provided with a second land region arranged adjacently to and axially inside the shoulder circumferential groove, and the second land region is provided with second axial grooves extending in the tire axial direction.

[Present Disclosure 9]

The tire according to present disclosure 8, wherein each of the second axial grooves has a length in the tire axial direction of 50% or more and 85% or less of a width in the tire axial direction of the second land region.

[Present Disclosure 10]

The tire according to present disclosure 8 or 9, wherein the tread portion is provided with a crown circumferential groove arranged axially inside the shoulder circumferential groove so as to demarcate the second land region between the crown circumferential groove and the shoulder circumferential groove, and the second axial grooves are directly connected with the crown circumferential groove.

[Present Disclosure 11]

The tire according to present disclosure 10, wherein an angle between each of the second axial grooves and the crown circumferential groove is 30 degrees or more and 60 degrees or less.

[Present Disclosure 12]

The tire according to present disclosure 10 or 11, wherein the second land region is provided with axial sipes extending axially outward from the crown circumferential groove so as to terminate to have a closed end within the second land region.

[Present Disclosure 13]

The tire according to any one of present disclosures 8 to 12, wherein the second land region is provided with crossing sipes each crossing the second land region.

DESCRIPTION OF REFERENCE SIGNS 1 tire
2 tread portion
3 first land region
7 first sipe
8 axial sipe
8i inner end of axial sipe
8e outer end of axial sipe
9 first axial groove
Te tread edge

The invention claimed is:

1. A tire comprising:
a tread portion;
a tread edge;
a shoulder circumferential groove provided in the tread portion and extending in a tire circumferential direction; and
a first land region demarcated between the shoulder circumferential groove and the tread edge, wherein
the first land region is provided with a plurality of first sipes extending in the tire circumferential direction, a plurality of axial sipes, and a plurality of first axial grooves extending inward in a tire axial direction from the tread edge,
the first sipes are not connected with the first axial grooves,
each of the axial sipes has an inner end in the tire axial direction connected with the shoulder circumferential groove,
each of the axial sipes has an outer end in the tire axial direction connected with one of the first sipes,
the first land region is provided with a plurality of second sipes,
each of the second sipes is connected with an inner end in the tire axial direction of a respective one of the first axial grooves, and
the second sipes are connected only with the first axial grooves.

2. The tire according to claim 1, wherein at least one of the first sipes is connected with the axial sipes.

3. The tire according to claim 1, wherein the second sipes extend in the tire circumferential direction.

4. The tire according to claim 1, wherein each of the first axial grooves has a length in the tire axial direction of 75% or more and 85% or less of a width in the tire axial direction of the first land region.

5. The tire according to claim 1, wherein each of the first axial grooves has an angle of 20 degrees or more and 45 degrees or less with respect to the tire axial direction.

6. The tire according to claim 1, wherein
the tread portion is provided with a second land region arranged adjacently to and axially inside the shoulder circumferential groove, and
the second land region is provided with second axial grooves extending in the tire axial direction.

7. The tire according to claim 6, wherein each of the second axial grooves has a length in the tire axial direction of 50% or more and 85% or less of a width in the tire axial direction of the second land region.

8. The tire according to claim 6, wherein
the tread portion is provided with a crown circumferential groove arranged axially inside the shoulder circumferential groove so as to demarcate the second land region between the crown circumferential groove and the shoulder circumferential groove, and
the second axial grooves are directly connected with the crown circumferential groove.

9. The tire according to claim 8, wherein an angle between each of the second axial grooves and the crown circumferential groove is 30 degrees or more and 60 degrees or less.

10. The tire according to claim 8, wherein the second land region is provided with axial sipes extending axially outward from the crown circumferential groove so as to terminate to have a closed end within the second land region.

11. The tire according to claim 6, wherein the second land region is provided with crossing sipes each crossing the second land region.

12. The tire according to claim 1, wherein each of the first sipes extends in an arc shape.

13. The tire according to claim 1, wherein each of the axial sipes is continuously inclined to one side in the tire circumferential direction with respect to the tire axial direction and is formed in an arc shape convex to one side in the tire circumferential direction.

14. The tire according to claim 13, wherein each of the first axial grooves is inclined to the same side as the axial sipes with respect to the tire axial direction and is formed in an arc shape convex to the same side as the axial sipes in the tire circumferential direction.

15. The tire according to claim 1, wherein the first axial grooves overlap with the axial sipes in the tire axial direction.

16. The tire according to claim 1, wherein
each of the first sipes extends in an arc shape convex to one side in the tire axial direction, and
each of the second sipes extends in an arc shape convex to another side in the tire axial direction.

17. The tire according to claim 16, wherein the first sipes and the second sipes are arranged alternately one by one in the tire circumferential direction.

18. The tire according to claim 1, wherein the second sipes are arranged axially inside the first sipes.

\* \* \* \* \*